(12) United States Patent
Linnell et al.

(10) Patent No.: US 7,082,100 B2
(45) Date of Patent: Jul. 25, 2006

(54) STORAGE SYSTEM ADAPTER AND METHOD OF USING SAME

(75) Inventors: Thomas Linnell, Northboro, MA (US); Steven Touch, Attleboro, MA (US)

(73) Assignee: EMC Corporation, Hopkinton, MA (US)

( * ) Notice: Subject to any disclaimer, the term of this patent is extended or adjusted under 35 U.S.C. 154(b) by 590 days.

(21) Appl. No.: 09/796,168

(22) Filed: Feb. 28, 2001

(65) Prior Publication Data

US 2002/0118685 A1 Aug. 29, 2002

(51) Int. Cl.
*H04L 3/14* (2006.01)
*G06F 15/173* (2006.01)

(52) U.S. Cl. ............... 370/217; 370/221; 370/225; 709/235; 709/239

(58) Field of Classification Search ............ 370/252, 370/255, 401, 463, 466, 216–228; 398/58, 398/135, 1–5; 709/203, 213–216, 221, 235, 709/239, 242
See application file for complete search history.

(56) References Cited

U.S. PATENT DOCUMENTS

| 5,269,011 | A | | 12/1993 | Yanai et al. | |
| 5,335,352 | A | | 8/1994 | Yanai et al. | |
| 5,901,327 | A | * | 5/1999 | Ofek | 710/5 |
| 6,055,228 | A | * | 4/2000 | DeKoning et al. | 370/258 |
| 6,188,668 | B1 | * | 2/2001 | Brewer et al. | 370/222 |
| 6,201,787 | B1 | * | 3/2001 | Baldwin et al. | 370/222 |
| 6,282,188 | B1 | * | 8/2001 | Hashemi et al. | 370/351 |
| 6,421,711 | B1 | * | 7/2002 | Blumenau et al. | 709/213 |
| 6,697,914 | B1 | * | 2/2004 | Hospodor et al. | 711/112 |

FOREIGN PATENT DOCUMENTS

| EP | 0 488 057 A1 | 6/1992 |
| WO | WO 98/28882 | 7/1998 |
| WO | WO 00/55742 | 9/2000 |

OTHER PUBLICATIONS

International Search Report from International Application No. PCT/US 01/47505, filed Oct. 30, 2001, 2 Pages.
Vitesse Semiconductor Corporation, "Fibre Channel Port Bypass Circuit," www.vitesse.com/products/categories.cfm?family_id=9&category_id=25, Vitesse Semiconductor Corporation (Camarillo, CA), p. 1-2, (Copyright 2000).
Vitesse Semiconductor Corporation, Advance Product Information VSC7130, "Dual Repeater/Retimer for Fibre Channel and Gigabit Ethernet," G52297-0, Rev. 2.3, Vitesse Semiconductor Corporation (Camarillo, CA), p. 1-22, (Jan. 17, 2000).

(Continued)

*Primary Examiner*—Chi Pham
*Assistant Examiner*—Ronald Abelson
(74) *Attorney, Agent, or Firm*—BainwoodHuang (57) ABSTRACT

In one embodiment of the present invention, an adapter device is provided that may be used in a data storage system to permit data communication among host computer nodes external to the system and data storage system processors. The adapter device of this embodiment includes two or more network nodes configured to provide at least one network. The network may be used to interconnect the host computer nodes and the processors so as to permit the data communication among the host computer nodes and the processors. At least one of the network nodes is configurable so as to change the topology of the network. When the network's topology is changed in this manner, the nature of the data communication permitted by the network among at least certain of the processors and the host computer nodes is also changed.

24 Claims, 5 Drawing Sheets

OTHER PUBLICATIONS

Finisar Corporation, "Optical Data Links/1×28 Transceivers,"www.finisar.com/1x28_transceivers.html, Finisar Corporation (Sunnyvale, CA), p. 1-2, (Copyright 2000).

Finisar Corporation, FTR-1311-2 Product Information, "Low-Cost, Single-Mode, Gigabit Fiber Optic Transceiver," Finisar Corporation (Mountain View, CA), p. 1-2.

Hewlett Packard, "HP Fibre Channel Tachyon TL Fabric Migration Guide/HP Fibre Channel Mass Storage," (Manufacturing Part Number: J2635-90004/E1200), 3rd Ed., Hewlett Packard Company (US), p. 1-24, (Copyright 2000).

Hewlett Packard, "HP A5158A Fibre Channel Adapter Release Notes/Release AP1200/HP Fibre Channel Mass Storage," (Manufacturing Part Number: J2635-90006/E1200), Hewlett Packard Company (US), p. 1-24, (Copyright 2000).

* cited by examiner

STORAGE SYSTEM ADAPTER AND METHOD OF USING SAME

BACKGROUND OF THE INVENTION

1. Field of the Invention

The present invention relates generally to a network data storage system for use with a plurality of host computer nodes, and more specifically, to an adapter (and method of using same) that may be used in such a data storage system to permit data communication among external data exchanging devices and data storage system processors.

2. Brief Description of Related Prior Art

Network computer systems generally include a plurality of geographically separated or distributed computer nodes that are configured to communicate with each other via, and are interconnected by, one or more network communications media. One conventional type of network computer system includes a network storage subsystem that is configured to provide a centralized location in the network at which to store, and from which to retrieve data. Advantageously, by using such a storage subsystem in the network, many of the network's data storage management and control functions may be centralized at the subsystem, instead of being distributed among the network nodes.

One type of conventional network storage subsystem, manufactured and sold by the Assignee of the subject application (hereinafter "Assignee") under the tradename Symmetrix™, includes a plurality of disk mass storage devices configured as one or more redundant arrays of independent (or inexpensive) disks (RAID). The disk devices are controlled by disk controllers (commonly referred to as "back end" controllers/directors) that are coupled to a shared cache memory resource in the subsystem. The cache memory resource is also coupled to a plurality of host controllers (commonly referred to as "front end" controllers/directors). The disk controllers are coupled to respective disk adapters that, among other things, interface the disk controllers to bus systems (e.g., small computer system interface (SCSI) based bus systems) used to couple the disk devices to the disk controllers. Similarly, the host controllers are coupled to respective host channel adapters that, among other things, interface the host controllers via channel input/output (I/O) ports to the network communications channels (e.g., SCSI, Enterprise Systems Connection (ESCON), or Fibre Channel (FC) based communications channels) that couple the storage subsystem to computer nodes in the computer network external to the subsystem (commonly termed "host" computer nodes or "hosts").

Each of the disk controllers comprises either one or two respective processors that control, manage, and facilitate transfers of data to and from the disk devices and the shared cache memory in the subsystem. Similarly, each of the host controllers comprises either one or two respective processors (hereinafter termed "host controller processors") that control, manage, and facilitate transfers of data to and from the shared cache memory in the subsystem and the host nodes.

In the aforesaid conventional storage subsystem manufactured by the Assignee (hereinafter "the Assignee's conventional storage system"), the host adapters include internal data paths that permit communication among the host nodes and the host controller processors. In each respective host adapter, however, these internal data paths do not connect all of the respective I/O ports of that adapter to all of the processors of host controller that is coupled to that adapter. Instead, depending upon the configuration of the Assignee's conventional storage system, the internal data paths of a respective host adapter may only connect two respective I/O ports of that adapter to a single respective host controller processor. Thus, as can be readily appreciated, unless means are provided to enhance the ability of, and flexibility with which, the host controller processors and host nodes may communicate among themselves, an undesirable rigidity may be imposed in the manner in which communications may be effected among host nodes and host controller processors, and the ability of the host nodes and the processors to communicate among themselves may be undesirably limited.

One technique that has been proposed for overcoming these problems and drawbacks of the prior art involves coupling a standalone controllable switch or hub device between the channel I/O ports and the host nodes, so as to permit any channel I/O port to exchange data/commands with any host node. Unfortunately, such devices may be relatively complex and expensive, and substantial amounts of time and effort may be required to properly install such device in the data storage network. Also unfortunately, substantial additional amounts of time and effort may be required to properly configure, manage and maintain such a device after it has been installed in the network.

SUMMARY OF THE INVENTION

In accordance with the present invention, a technique is provided that overcomes the aforesaid and other disadvantages and drawbacks of the above prior art. In one embodiment of the technique of the present invention, a multiplicity of network nodes are provided in a host adapter in a network data storage system. The network nodes in the adapter may be configured so as to provide at least one network in the adapter that may be used to interconnect host computer nodes coupled to host adapter (i.e., via respective I/O ports in the host adapter) and processors (e.g., host controller processors) in the storage system, so as to permit data communication among the processors and the host computer nodes via the network. One or more of the nodes of the network in the host adapter may be selectively configurable so as to permit the topology of the network to be changed from at least one topology to at least one other topology. Depending upon the topology of the network (e.g., whether the network has the one topology or the other topology), the nature of the data communication permitted by the network among at least certain of the processors and the host computer nodes may differ.

In this embodiment of the technique of the present invention, when the network in the adapter has the one topology, the nature of the data communication permitted by the network may be such that one of the processors may communicate data with only a first subset of the host computer nodes. Conversely, in this embodiment, when the network has the other topology, the nature of the data communication permitted by the network may be such that the one processor may communicate data with a second subset of the host computer nodes. The first and second subsets of host computer nodes may have respective numbers of host computer nodes equal to M and N, respectively, where N is twice (or greater than) M. The second subset of host computer nodes may comprise all of the host computer nodes that may be coupled to the adapter's channel I/O ports.

Also when the network in the adapter has the one topology, the nature of the data communication permitted by the network may be such that the network may permit another of the processors to communicate data with a third subset of the host computer nodes. Conversely, when the network in the adapter has the other topology, the nature of the data communication permitted by the network may be such that the network may permit the other processor to communicate data with the second subset of the host computer nodes. The third subset of the host computer nodes may be different from the first subset of the host computer nodes.

Also in this embodiment, the network in the adapter may comprise at least one FC arbitrated loop network. The adapter may comprise one or more optical transceivers that may be used in coupling (e.g., via FC communication channels) one or more of the host computer nodes to the network in the adapter.

When the network in the adapter has the one topology, the network may comprise two network loops. Conversely, when the network has the other topology, the one or more selectively configurable network nodes may connect the two network loops so as to form a single logical loop.

In one aspect of the present invention, an adapter device embodying features of the technique of the present invention is provided. In a second aspect of the present invention, a method of using such an adapter device is provided. In a third aspect of the present invention, computer-readable memory comprising executable computer program instructions is provided. The program instructions, when executed, cause features of the present invention to be implemented.

Thus, according to the present invention, the topology of the network in the host adapter may be selectively changed such that the nature of the data communication permitted among the processors (e.g., front end director processors) in the data storage system and the host computer nodes (e.g., via the adapter's I/O ports) may also be changed. Depending upon the topology selected for the network in the adapter, a given processor may be able to communicate data with different respective subsets of the host computer nodes (i.e., via different respective subsets of the channel I/O ports in the adapter). Advantageously, this may permit communications to be carried out among the processors and host computer nodes according to the present invention, with greater flexibility than is possible in the prior art. Also advantageously, according to the present invention, the ability of the host computer nodes and the processors to communicate data among themselves may be enhanced compared to the prior art. Further advantageously, the network used in the host adapter of the present invention may be relatively less expensive and/or complex than the aforesaid conventional controllable switch or hub arrangements, and substantially less time and effort may be required to install, configure, maintain, and manage the host adapter of the present invention in a data storage network compared to such conventional switch or hub arrangements.

These and other features and advantages of the present invention will become apparent as the following Detailed Description proceeds and upon reference to the Figures of the Drawings, in which like numerals depict like parts, and wherein:

Although the following Detailed Description will proceed with reference being made to illustrative embodiments and methods of use of the present invention, it should be understood that it is not intended that the present invention be limited to these illustrative embodiments and methods of use. On contrary, many alternatives, modifications, and equivalents of these illustrative embodiments and methods of use will be apparent to those skilled in the art. Accordingly, the present invention should be viewed broadly as encompassing all such alternatives, modifications, and equivalents as will be apparent to those skilled in art, and should be viewed as being defined only as forth in the hereinafter appended claims.

DETAILED DESCRIPTION OF ILLUSTRATIVE EMBODIMENTS

Figure 1:
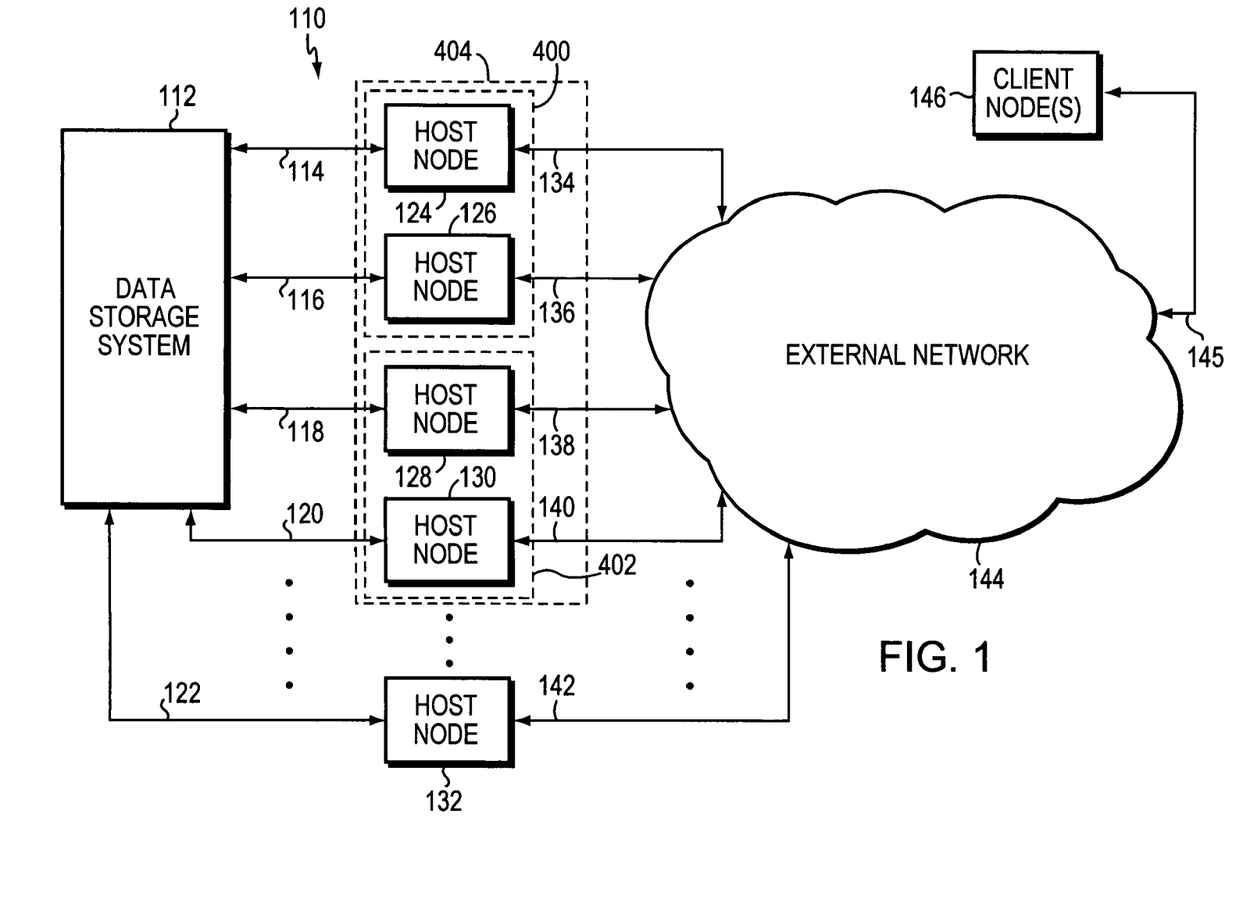
FIG. 1 is a high level schematic block diagram of a data storage network that includes a data storage system having a host adapter according to one embodiment of the present invention.

Turning now to FIGS. 1–5, illustrative embodiments of the present invention will be described. FIG. 1 is a high level block diagram illustrating a data storage network 110 that includes a data storage system 112 having one or more host adapters 26 (See, FIG. 2) according to one embodiment of the present invention. System 112 is coupled via FC protocol optical communication links 114, 116, 118, 120, . . . 122 to respective host computer nodes 124, 126, 128, 130, . . . 132. Host nodes 124, 126, 128, 130, . . . 132 are also coupled via additional respective conventional network communication links 134, 136, 138, 140, . . . 142 to an external network 144. Network 144 may comprising one or more Transmission Control Protocol/Internet Protocol (TCP/IP)-based and/or Ethernet-based local area and/or wide area networks. Network 144 is also coupled to one or more client computer nodes (collectively or singly referred to by numeral 146 in FIG. 1) via network communication links (collectively referred to by numeral 145 in FIG. 1). The network communication protocol or protocols utilized by the links 134, 136, 138, 140, . . . 142, and 145 are selected so as to ensure that the nodes 124, 126, 128, 130, . . . 132 may exchange data and commands with the nodes 146 via network 144.

Host nodes may be any one of several well known types of computer nodes, such as server computers, workstations, or mainframes. In general, each of the host nodes 124, 126, 128, 130, . . . 132 and client nodes 146 comprises a respective computer-readable memory (not shown) for storing software programs and data structures associated with, and for carrying out the functions and operations described herein as being carried by these nodes 124, 126, 128, 130, . . . 132, and 146. In addition, each of the nodes 124, 126, 128, 130, . . . 132, and 146 further includes one or more respective processors (not shown) and network communication devices for executing these software programs, manipulating these data structures, and for permitting and facilitating exchange of data and commands among the host nodes 124, 126, 128, 130, . . . 132 and client nodes 146 via the communication links 134, 136, 138, 140, . . . 142, network 144, and links 145. The execution of the software programs by the processors and network communication devices included in the hosts 124, 126, 128, 130, . . . 132 also permits and facilitates exchange of data and commands among the nodes 124, 126, 128, 130, . . . 132 and the system 112 via the FC links 114,116,118,120, . . . 122, in the manner that will be described below.

Figure 2:
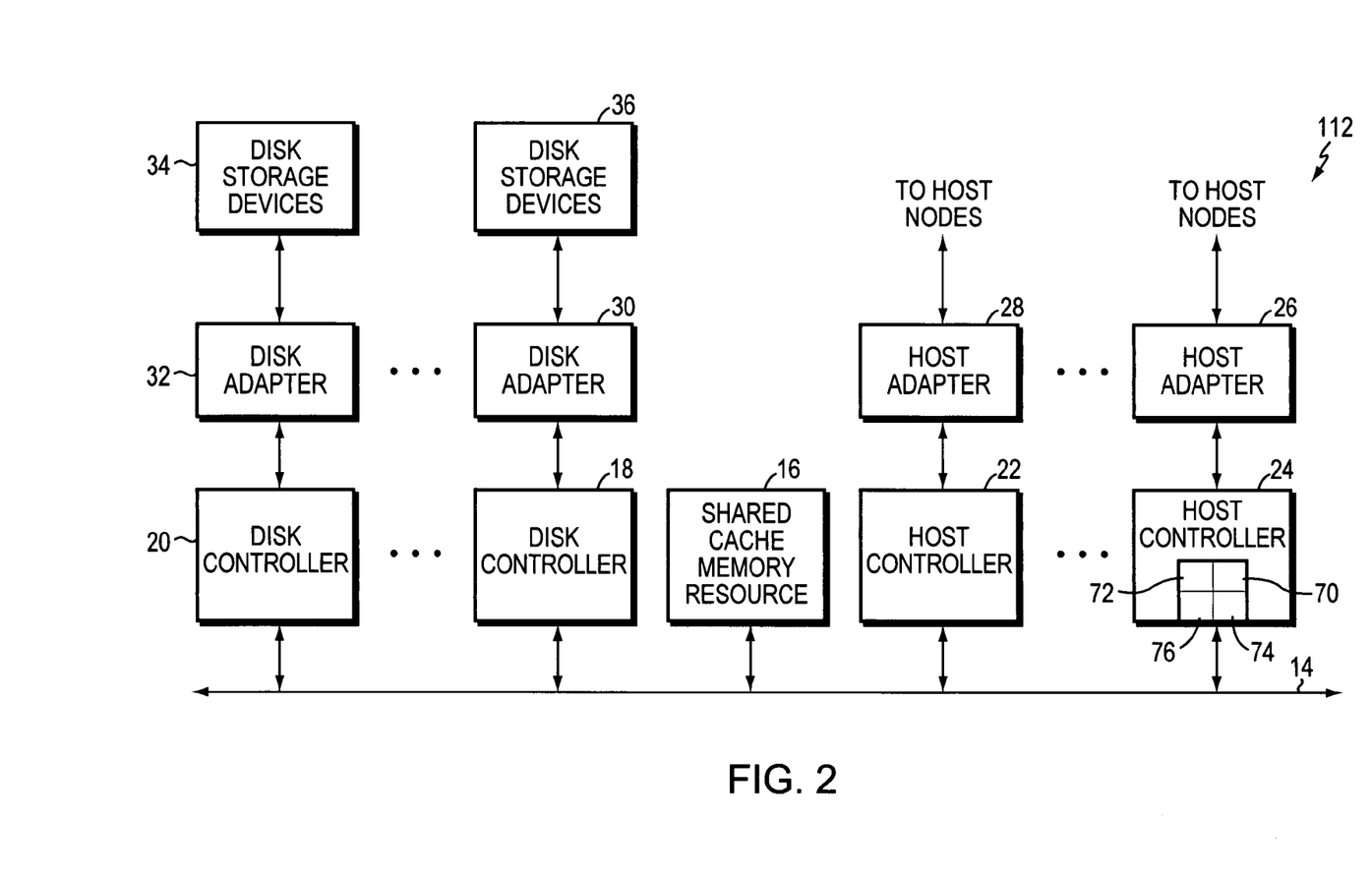
FIG. 2 is a high level schematic block diagram illustrating functional components of the data storage system included in the data storage network shown in FIG. 1.

FIG. 2 is a high level schematic block diagram of functional components of the system 112. System 112 includes a bus system 14 that electrically couples together a plurality of host controllers 22 . . . 24, a plurality of disk controllers 18 . . . 20, and a shared cache memory resource 16. Bus system 14 may include a plurality of redundant buses (not shown) and bus arbitration and control system (also not shown).

Each host controller 22 . . . 24 may comprise a single respective circuit board or panel. Likewise, each disk controller 18 . . . 20 may comprise a single respective circuit board or panel. Each disk adapter 30 . . . 32 may comprise a single respective circuit board or panel. Likewise, each host adapter 26 . . . 28 may comprise a single respective circuit board or panel. Each host controller 22 . . . 24 may be electrically and mechanically coupled to a respective host adapter 28 . . . 26, respectively, via a respective mating electromechanical coupling system.

In this embodiment of system 112, although not shown explicitly in the Figures, each host adapter 26 . . . 28 may be coupled to four respective host nodes via respective FC links. For example, in this embodiment of system 112, adapter 26 may be coupled to host nodes 124, 126, 128, 130 via respective FC links 114, 116, 118, 120. It should be appreciated that the number of host nodes to which each host adapter 26 . . . 28 may be coupled may vary, depending upon the particular configurations of the host adapters 26 . . . 28, and host controllers 22 . . . 24, without departing from the present invention.

Disk adapter 32 is electrically coupled to a set of mass storage devices 34, and interfaces the disk controller 20 to those devices 34 so as to permit exchange of data and commands between processors (not shown) in the disk controller 20 and the storage devices 34. Disk adapter 30 is electrically coupled to a set of mass storage devices 36, and interfaces the disk controller 18 to those devices 36 so as to permit exchange of data and commands between processors (not shown) in the disk controller 18 and the storage devices 36. The devices 34, 36 may be configured as redundant arrays of conventional disk mass storage devices.

It should be appreciated that the respective numbers of the respective functional components of system 112 shown in FIG. 2 are merely for illustrative purposes, and depending upon the particular application to which the system 112 is intended to be put, may vary without departing from the present invention. It may be desirable, however, to permit the system 112 to be capable of failover fault tolerance in the event of failure of a particular component in the system 112. Thus, in practical implementation of the system 112, it may be desirable that the system 112 include redundant functional components and a conventional mechanism for ensuring that the failure of any given functional component is detected and the operations of any failed functional component are assumed by a respective redundant functional component of the same type as the failed component.

The general manner in which data may be retrieved from and stored in the system 112 will now be described. Broadly speaking, in operation of system 110, a client node 146 may forward a request to retrieve data to a host node (e.g., node 124) via one of the links 145 associated with the client node 146, network 144 and the link 134 associated with the host node 124. If data being requested is not stored locally at the host node 124, but instead, is stored in the data storage system 112, the host node 124 may request the forwarding of that data from the system 112 via the FC link 114 associated with the node 124.

As will be described more fully below, the request forwarded via link 114 is initially received by the host adapter 26 coupled to that link 114. The host adapter 26 associated with link 114 may then forward the request to the host controller 24 to which it is coupled. In response to the request forwarded to it, the host controller 24 may then ascertain from data storage management tables (not shown) stored in the cache 16 whether the data being requested is currently in the cache 16; if the requested data is currently not in the cache 16, the host controller 24 may request that the disk controller (e.g., controller 18) associated with the storage devices 36 within which the requested data is stored retrieve the requested data into the cache 16. In response to the request from the host controller 24, the disk controller 18 may forward via the disk adapter to which it is coupled appropriate commands for causing one or more of the disk devices 36 to retrieve the requested data. In response to such commands, the devices 36 may forward the requested data to the disk controller 18 via the disk adapter 30. The disk controller 18 may then store the requested data in the cache 16.

When the requested data is in the cache 16, the host controller 22 may retrieve the data from the cache 16 and forward it to the host node 124 via the adapter 26 and link 114. The host node 124 may then forward the requested data to the client node 146 that requested it via the link 134, network 144 and the link 145 associated with the client node 146.

Additionally, a client node 146 may forward a request to store data to a host node (e.g., node 124) via one of the links 145 associated with the client node 146, network 144 and the link 134 associated with the host node 124. The host node 124 may store the data locally, or alternatively, may request the storing of that data in the system 112 via the FC link 114 associated with the node 124.

The data storage request forwarded via link 114 is initially received by the host adapter 26 coupled to that link 114. The host adapter 26 associated with link 114 may then forward the data storage request to the host controller 24 to which it is coupled. In response to the data storage request forwarded to it, the host controller 24 may then initially store the data in cache 16. Thereafter, one of the disk controllers (e.g., controller 18) may cause that data stored in the cache 16 to be stored in one or more of the data storage devices 36 by issuing appropriate commands for same to the devices 36 via the adapter 30.

Figure 3:
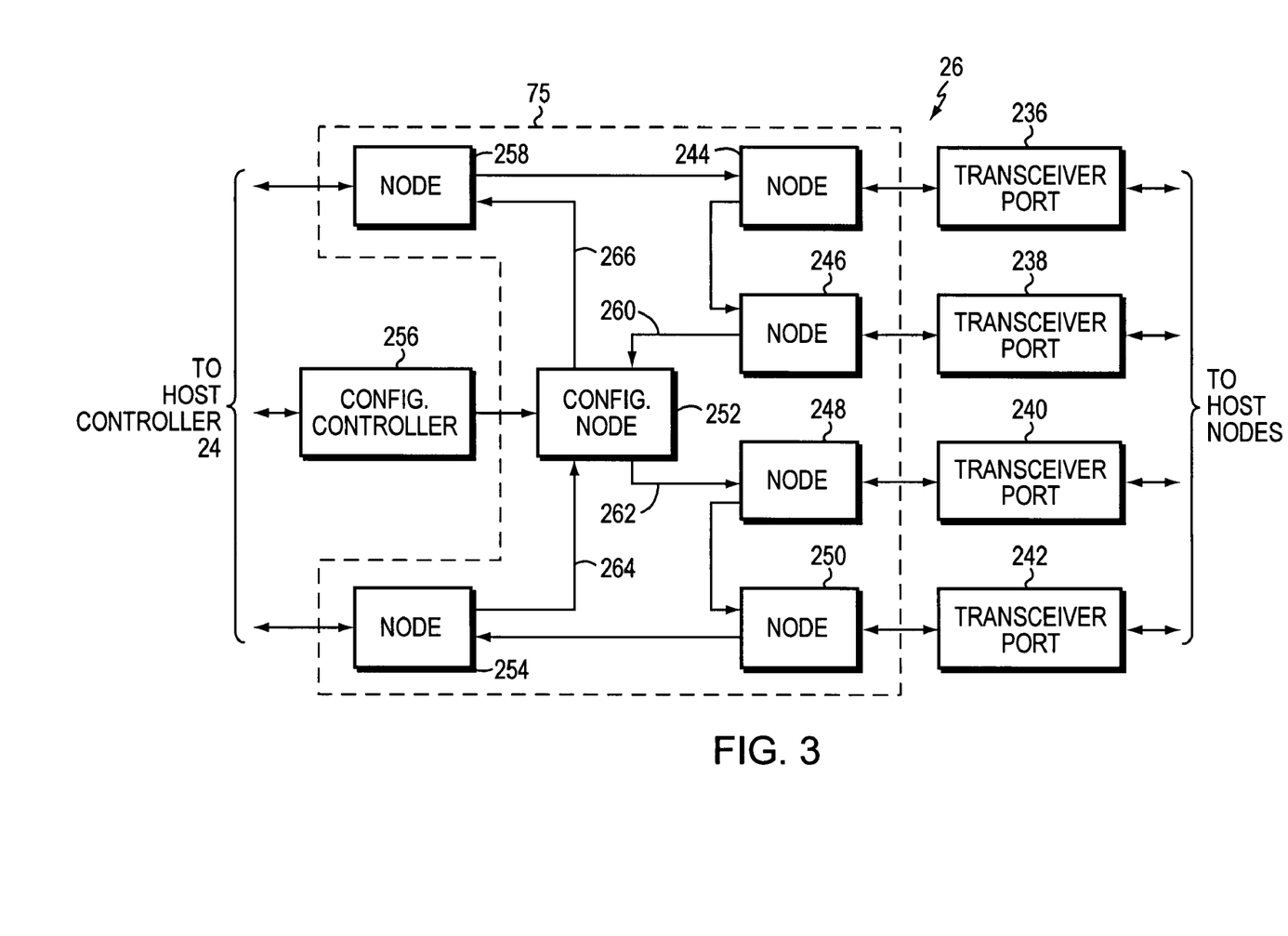
FIG. 3 is a high level schematic block diagram illustrating functional components of an adapter made according to one embodiment of the present invention, which device may be used in the data storage system of FIG. 2.

With particular reference being made to FIGS. 2–5, the construction and operation of illustrative embodiments of the present invention will now be described. Each of the host adapters 26 . . . 28 in the system 112 has a identical respective construction and operation; thus, only the construction and operation of a single host adapter 26 will be described herein. As shown in FIG. 3, adapter 26 includes a plurality of optical transceiver I/O ports 236, 238, 240, 242 that are coupled to the respective FC links 114, 116, 118, 120 that permit the adapter 26 to communicate data and commands with the respective four host nodes 124, 126, 128, 130 with which the adapter 26 is associated. In this embodiment of the present invention, each of the ports 236, 238, 240, 242 comprises a respective 1×28 optical data link transceiver device of the type manufactured by and commercially available from Finisar Corporation of Mountain View, Calif., United States of America. Ports 236, 238, 240,

242 convert respective optical communication signals received by the host adapter 26 via the channels 114, 116, 118, 120 into respective electrical signals that are provided to nodes 244, 246, 248, 242, respectively, of a network 75 provided in the adapter 26 according to this embodiment of the present invention. Ports 236, 238, 240, 242 also convert respective electrical communication signals received from the nodes 244, 246, 248, 250, respectively, into respective optical communication signals that are provided by the host adapter 26 via the channels 114, 116, 118, 120 to the host nodes 124, 126, 128, 130, respectively. In this embodiment of the present invention network 75 includes a plurality of nodes 244, 246, 248, 250, 252, 254, 258 that are coupled together and configured so as to essentially provide a FC hub arrangement whose purpose and operation are described below.

In accordance with this hub arrangement, each of the host controller processors 70, 72 in the host controller 24 may be associated with and coupled to a respective FC protocol processors 74, 76. The processors 74, 76 are of conventional construction and may provide FC Arbitrated Loop (AL) protocol/arbitration functions for the processors 70, 72 in the network 75 so as to permit the network 75 to function as a FC AL hub with the processors 70, 72 and host nodes 124, 126, 128, 130 functioning as the FC devices that communicate among each other using the hub network 75. The processors 74, 76 also provide FC AL initialization functions and handle the necessary processing to generate FC ordered sets, primitive sequences, data frames, etc. for the processors 70, 72 based upon data and commands provided to the processors 74, 76 by the respective processors 70, 72 so as to permit the processors 70, 72 to communicate data and commands with the host nodes 124, 126, 128, 130 using FC AL protocol.

In network 75, each of the nodes 244, 246, 248, 250 254, 258, may be configured to sense, using conventional techniques, whether a valid FC AL receiving device is directly coupled to it. Such a valid FC AL receiving device may be an intended recipient device of a FC data frame transmitted through the hub network 75 that originated from a FC transmitting device that presently has gained from the FC AL arbitrating device (i.e., the one device in an FC AL that, as a result of the FC AL protocol negotiation/initialization process, was selected to be the arbitration device) the right to transmit said frame through the network 75. Such valid recipients may be e.g., host nodes 124, 126, 128, 130 and processors 70, 72.

If one of the nodes 244, 246, 248, 250, 254, 258 in network 75 receives a FC data frame, and that node is directly coupled to a valid FC receiving device, the node forwards the frame to the receiving device. Conversely, if one of these nodes in network 75 receives such a frame and is not directly coupled to such a receiving device, that node forwards the frame to the next network hop in the network 75. For example, the next network hop for node 244 is node 246. The next node hop for node 248 is node 250. The next node hop for node 250 is node 254. The next node hop for node 258 is node 244.

Figure 4:
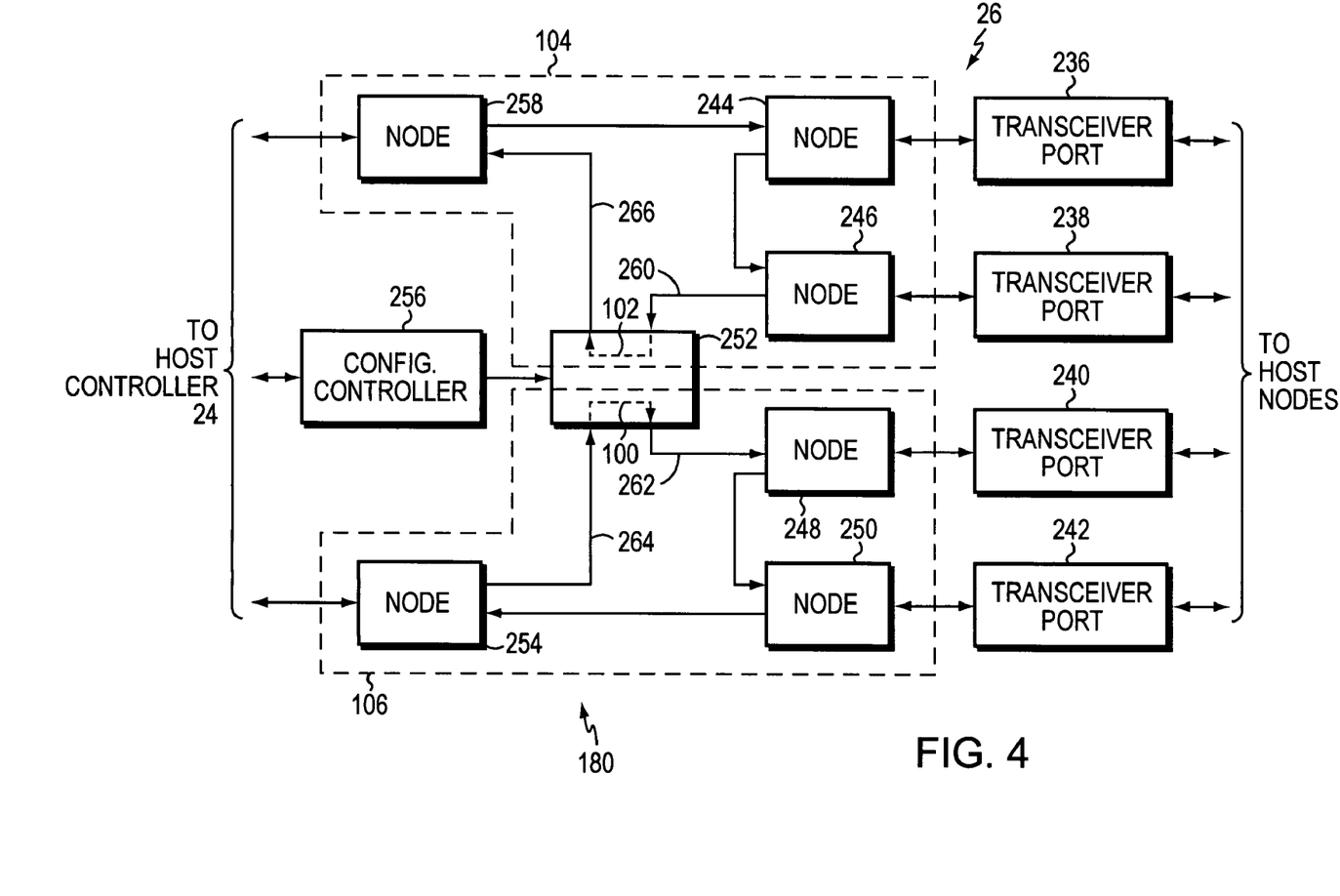
FIG. 4 is a high level schematic block diagram illustrating a configuration of the adapter of FIG. 3 when a network comprised in the adapter has a first topology.
Figure 5:
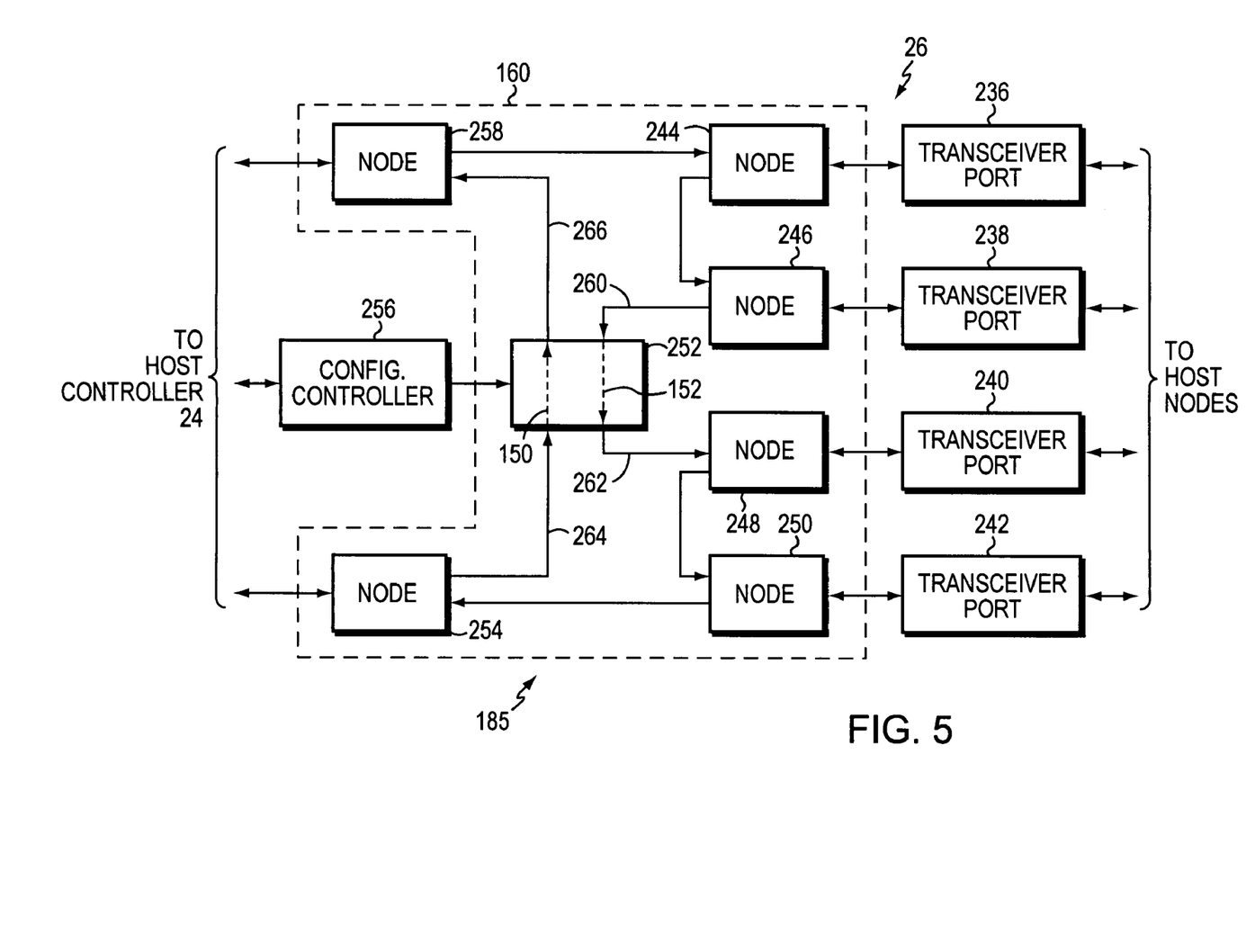
FIG. 5 is a high level schematic block diagram illustrating a configuration of the adapter of FIG. 3 when a network comprised in the adapter has a second topology.

With particular reference now being made to FIGS. 4–5, in this embodiment of the present invention, nodes 252 are selectively configurable by control signals supplied to nodes 252 from configuration controller 256. More specifically, the control signals supplied to the nodes 252 from the controller 256 may select one of at least two possible interconnection states for the nodes 252 in the network 75. In a first of these possible interconnection states (see FIG. 4), the nodes 252 provide an interconnection 102 (shown in ghost) that electrically interconnects an output line 260 of the node 246 to an input line 266 of the node 258; also in this possible interconnection state, the nodes 252 provide an interconnection 100 (shown in ghost) that electrically interconnects an output line 264 of node 254 to an input line 262 of the node 248. In a second of these possible interconnection states (see FIG. 5), the nodes 252 provide an interconnection 152 (shown in ghost) that electrically interconnects output line 260 to input line 262; also in the second possible interconnection state, the nodes 252 provide an interconnection 150 (shown in ghost) that electrically interconnects the output line 264 to input line 266.

When the nodes 252 have the first possible configuration (shown in FIG. 4), as a result of the interconnections 100, 102 provided by the nodes 252, the network 75 has a first possible topology 180. When the network 75 has this first topology 180, the network 75 may be configured so as to comprise two separate network loops 104, 106. One 104 of the two loops 104, 106 may comprise nodes 244, 246, 252 and 258. The other 106 of the two loops 104, 106 may comprise nodes 248, 250, 254, and 252. In this first topology 180, the next hop for a frame received by the nodes 252 from the node 246 is the node 258. Conversely, the next hop for a frame received by the nodes 252 from the node 254 is node 248.

Conversely, when the nodes 252 have the second possible configuration (shown in FIG. 5), as a result of the interconnections 150, 152 provided by the nodes 252, the network 75 has a second possible topology 185. When the network 75 has the second topology 185, the network 75 is configured so as to comprise a single logical network loop 160. This single logical network loop 160 may comprise nodes 244, 246, 248, 250, 252, 254, and 258. In the single logical loop 160, the two loops 104, 106 are effectively coupled together or bridged by the nodes 252. In this second topology 185, the next hop for a frame received by the node 252 from the node 246 is the node 248. Conversely, in this second topology 185, the next hop for a frame received by the node 252 from the node 254 is the node 258.

As stated previously, adapter 26 may be electrically coupled to the host controller 24 via a mating electromechanical coupling system. When the adapter 26 is so electrically coupled to the host controller 24, a single one 70 of the two processors 70, 72 in host controller 24 may be electrically coupled to and exchange data and commands with node 258 (using its associated FC processor 74). Also when the adapter 26 is so electrically coupled to the host controller 24, a single one 72 of the two processors 70, 72 in the host controller 24 may be electrically coupled to and exchange data and commands with node 254 (using its associated FC processor 76). Additionally, when the controller 24 is so electrically coupled to the adapter 26, the processors 70, 72 may control the configuration controller 256. Thus, by appropriately controlling the controller 256, the processors 70, 72 may select/change the configuration of the nodes 252. Thus, the processors 70, 72 may change the topology of the network 75 from the first topology 180 to the second topology 185, and vice versa.

In view of the foregoing, when the network 75 has the first topology 180, the network 75 may allow the host controller processor 70 to communicate (e.g., exchange data and commands) only with host nodes 124, 126 comprised in a first subset 400 of the host nodes 124, 126, 128, 130 that are coupled to the adapter 26. That is, when the network 75 has the first topology 180, the loop 104 effectively acts as a FC AL network loop that couples the processor 70 (via its FC processor 74) to the host nodes 124, 126, with the processor 70, through its FC processor 74, and the nodes 124, 126 acting as participating FC protocol devices in this FC AL network.

Likewise, when the network 75 has the first topology 180, the network 75 may allow the host controller processor 72 to communicate only with host nodes 128, 130 comprised in a second subset 402 of the host nodes 124, 126, 128, 130 that are coupled to the adapter 26. That is, when the network 75 has the first topology 180, the loop 106 effectively acts as a FC AL network loop that couples the processor 72 (via its FC processor 76) to the host nodes 128, 130, with the processor 72, through its FC processor 76, and the nodes 128, 130 acting as participating FC protocol devices in this FC AL network.

Conversely, when the network 75 has the second topology 185, the network may allow each of the two processors 70, 72 to communicate with host nodes 124, 126, 128, 130 comprised in a subset 404 of the host nodes 124, 126, 128, 130. That is, when the network 75 has the second topology 185, the loop 160 effectively acts as a FC AL network loop that couples the processors 70, 72 (via their respective FC processors 74, 76) to the host nodes 124, 126, 128, 130, with the processors 70, 72, through their respective processors 74, 76, and the nodes 124, 126, 128, 130 acting as participating FC protocol devices in this FC AL network. As can be readily seen, the number of host nodes comprised in subset 404 is twice that comprised in each of the subsets 400, 402.

Nodes 244, 246, 248, 250, 254, and 258 may each comprise respective VSC 7130 Dual Repeater/Retimer FC Port Bypass Circuits of the type manufactured and commercially available from Vitesse Semiconductor Corporation of Camarillo, Calif., United States of America. The one or more selectively configurable nodes 252 may comprise a plurality of such VSC 7130 Dual Repeater/Retimer FC Port Bypass Circuits coupled together so as to provide the above-described functionality of the one or more nodes 252. The configuration controller 256 may control and select the configuration of the one or more configurable nodes 252 by providing appropriate control signals to the serial ("two-wire") communications ports of the VSC 7130 Dual Repeater/Retimer FC Port Bypass Circuits (hereinafter "Circuits") comprised in the nodes 252 so as to change the states of the internal configuration selection registers of such Circuits; alternatively, the controller 256 may control and select the configuration of the nodes 252 by providing appropriate control signals to the "BYPx" control lines of such Circuits. In either case, the control signals provided by the controller 256 to such Circuits comprised in the nodes 252 may control "MUX3" multiplexers in such Circuits so as to cause the network 75 to have either the one topology 180 or the other topology 185.

Each of the processors 70, 72 may comprise a respective PowerPC™ microprocessor of the type manufactured by and commercially available from Motorola, Inc. of Austin, Tex., United States of America, and computer-readable memory. The FC processors 74, 76 may each comprise respective Tachyon™ FC protocol integrated circuit devices of the type manufactured by and commercially available from Agilent Technologies, Inc. of Palo Alto, Calif., United States of America.

In general, the computer-readable memory comprised in the processors 70, 72 stores software programs and data structures associated with, and for carrying out the inventive and other functions, methods, techniques, and operations described herein as being carried out by the processors 70, 72. The processors 70, 72 are configured to execute these software programs and manipulate these data structures. The execution of the software programs by the processors 70, 72 may cause and facilitate the inventive and other functions, methods, techniques, and operations described herein as being carried out by the processors 70, 72 so as to implement this embodiment of the present invention. It will be apparent to those skilled in the art that many types of processors and memories may be used according to the teachings of the present invention to implement said invention.

Thus, it is evident that there has been provided, in accordance with the present invention, an adapter device that may be used in a data storage system, and a method of using same, that fully satisfy the aims and objectives, and achieve the advantages, hereinbefore set forth. For example, although the present invention has been described in connection with embodiments that comprise or make use of a host adapter, if appropriately modified, the present invention may be advantageously embodied and/or used in connection with one or more of the disk controller adapters (e.g., disk adapters 30, 32). In such an alternative arrangement, one or more of the disk adapters (e.g., disk adapter 32) may be modified so as to comprise a respective network (not shown) that is identical to network 75. Such a modified adapter 32 may be configured to exchange data with and transmit commands to the disk storage devices 34 using FC AL protocol (instead of, e.g., using a SCSI-based protocol). Also in this alternate arrangement, the disk devices 34 may comprise FC AL protocol communication devices (not shown) that permit the devices 34 to exchange data with the disk adapter 32 and to receive commands from the adapters 32 using FC AL protocol. Additionally, the processors (not shown) in the disk controller 20 may be programmed to control communication of data and commands between the adapter 32 and the processors in the disk controller 20. These processors may also be programmed to control a respective controller (not shown, having the same construction as controller 256) in the adapter 32 so as to control the configuration of a configurable node (not shown, having the same construction as node 252). By controlling the configuration of the configurable node in the adapter 32, the processors in the controller 20 may control and change the topology of the network comprised in the adapter 32 in the same manner that the processors 70, 72 of the controller 24 may control and change the topology of the network 75 in the adapter 26. By so controlling the topology of the network in adapter 32, the nature of the data communication permitted by the network among the processors in the disk controllers 20 and the storage devices 36 may be changed in a manner that is substantially identical to the manner described above in which such data communication permitted by the network 75 in adapter 26 among the processors 70, 72 and the host nodes 124, 126, 128, 130, 132 may be changed.

The terms and expressions which have been employed in this application are used as terms of description and not of limitation, and there is no intention, in the use of such terms and expressions, of excluding any equivalents of the features shown and described or portions thereof, but it is recognized that various modifications are possible within the scope of the invention as claimed. Accordingly, the present invention should be viewed broadly as encompassing all modifications, variations, alternatives and equivalents as may be encompassed by the hereinafter appended claims.

What is claimed is:

1. Adapter configured for use in a data storage system to permit data communication among data exchanging devices and data storage system processors, the processors residing in the data storage system, the data exchanging devices being external to the adapter, the adapter comprising:
  a plurality of network nodes, the network nodes being configured to provide at least one network which is configured to interconnect the data exchanging devices and the processors so as to permit the communication among the data exchanging devices and the processors, at least one of the network nodes being configurable so as to change a topology configuration of the network between a first topology and a second topology, the communication permitted by the network among at least certain of the processors and the data exchanging devices being different depending upon which of the first topology and the second topology the network has;
  wherein when the network has the first topology, the network permits one of the processors to communicate only with a first subset of the devices, and when the network has the second topology, the network permits the one of the processors to communicate with a second subset of the devices, the first and second subsets having respective numbers of the devices equal to M and N, respectively, where M is less than N.

2. Adapter according to claim 1, wherein N is twice M.

3. Adapter according to claim 1, wherein the network comprises at least one fibre channel (FC) arbitrated loop network.

4. Adapter according to claim 3, further comprising at least one optical transceiver that may be used in coupling at least one host computer node to the network.

5. Adapter according to claim 1, wherein when the network has the first topology, the network permits another of the processors to communicate with a third subset of the devices, and when the network has the second topology, the network permits the other of the processors to communicate with the second subset of the devices, the third subset of the devices being different from the first subset of the devices.

6. Adapter according to claim 5, wherein the one and the other of the processors reside on a single circuit board, the board being connectable to the adapter so as to couple the one and the other of the processors to the network.

7. Adapter according to claim 5, wherein when the network has the first topology, the network comprises two network loops, and when the network has the second topology, the at least one of the network nodes connects the two loops so as to form a single logical loop.

8. Computer-readable memory comprising executable computer program instructions that when executed cause:
  configuring of at least one network node in a network comprising a plurality of network nodes, the network nodes being comprised in an adapter which is configured for use in a data storage system to permit data communication among data exchanging devices and data storage system processors residing in the data storage system, the devices being external to the adapter, the configuring of at least one network node changing a topology configuration of the network between a first network topology and a second network topology, the communication permitted by the network among at least certain of the processors and the devices being different depending upon which of the first topology and the second topology the network has;
  wherein when the network has the first topology, the network permits one of the processors to communicate only with a first subset of the devices, and when the network has the second topology, the network permits the one of the processors to communicate with a second subset of the devices, the first and second subsets having respective numbers of devices equal to M and N, respectively, where M is less than N.

9. Memory according to claim 8, wherein N is twice M.

10. Memory according to claim 8, wherein the network comprises at least one fibre channel (FC) arbitrated loop network.

11. Memory according to claim 10, wherein at least one optical transceiver is comprised in the adapter that may be used in coupling at least one host computer node to the network.

12. Memory according to claim 8, wherein when the network has the first topology, the network permits another of the processors to communicate with a third subset of the devices, and when the network has the second topology, the network permits the other of the processors to communicate with the second subset of the devices, the third subset of the devices being different from the first subset of the devices.

13. Memory according to claim 12, wherein the one and the other of the processors reside on a single circuit board, the board being connectable to the adapter so as to couple the one and the other of the processors to the network.

14. Memory according to claim 12, wherein when the network has the first topology, the network comprises two network loops, and when the network has the second topology, the at least one network node connects the two loops so as to form a single logical loop.

15. Method of using an adapter in a data storage system to permit data communication among data exchanging devices and data storage system processors, the processors residing in the data storage system, the devices being external to the adapter, the method comprising the steps of:
  configuring at least one network node in a network comprising a plurality of network nodes in the adapter, the configuring of at least one network node changing a topology configuration of the network between a first network topology and a second network topology, the communication permitted by the network among at least certain of the processors and the devices being different depending upon which of the first topology and the second topology the network has;
  wherein when the network has the first topology, the network permits one of the processors to communicate only with a first subset of the devices, and when the network has the second topology, the network permits the one of the processors to communicate with a second subset of the devices, the first and second subsets having respective numbers of devices equal to M and N, respectively, where M is less than N.

16. Method according to claim 15, wherein N is twice M.

17. Method according to claim 15, wherein the network comprises at least one fibre channel (FC) arbitrated loop.

18. Method according to claim 17, further comprising providing in the adapter at least one optical transceiver that may be used in coupling the at least one host computer node to the network.

19. Method according to claim 15, wherein when the network has the first topology, the network permits another of the processors to communicate with a third subset of the devices, and when the network has the second topology, the network permits the other of the processors to communicate with the second subset of the devices, the third subset of the devices being different from the first subset of the devices.

20. Method according to claim 19, wherein the one and the other of the processors reside on a single circuit board, the board being connectable to the adapter so as to couple the one and the other of the processors to the network.

21. Method according to claim 19, wherein when the network has the first topology, the network comprises two network loops, and when the network has the second topology, the at least one network node connects the two loops so as to form a single logical loop.

22. Adapter configured for use in a data storage system to permit data communication among data exchanging devices and data storage system processors, the processors residing in the data storage system, the data exchanging devices being external to the adapter, the adapter comprising:
- a plurality of network nodes, the network nodes being configured to provide at least one network which is configured to interconnect the data exchanging devices and the processors so as to permit the communication among the data exchanging devices and the processors, at least one of the network nodes being configurable so as to change a topology configuration of the network between a first topology and a second topology, the communication permitted by the network among at least certain of the processors and the data exchanging devices being different depending upon which of the first topology and the second topology the network has;
- wherein the data storage system includes disks, a cache, and disk controllers which are configured to operate as interfaces between the disks and the cache;
- wherein the processors are configured to operate as interfaces between the data exchanging devices and the cache; and
- wherein the network nodes are configured to selectively provide one of (i) a multiple loop formation between the processors and the data exchanging devices when the network has the first topology and (ii) a single loop formation between the processors and the data exchanging devices when the network has the second topology.

23. Computer-readable memory comprising executable computer program instructions that when executed cause:
- configuring of at least one network node in a network comprising a plurality of network nodes, the network nodes being comprised in an adapter which is configured for use in a data storage system to permit data communication among data exchanging devices and data storage system processors residing in the data storage system, the devices being external to the adapter, the configuring of at least one network node changing a topology configuration of the network between a first network topology and a second network topology, the communication permitted by the network among at least certain of the processors and the devices being different depending upon which of the first topology and the second topology the network has;
- wherein the data storage system includes disks, a cache, and disk controllers which are configured to operate as interfaces between the disks and the cache;
- wherein the processors are configured to operate as interfaces between the data exchanging devices and the cache; and
- wherein the executable computer program instructions, when causing configuring of at least one network node, selectively provide one of (i) a multiple loop formation between the processors and the data exchanging devices when the network has the first topology and (ii) a single loop formation between the processors and the data exchanging devices when the network has the second topology.

24. Method of using an adapter in a data storage system to permit data communication among data exchanging devices and data storage system processors, the processors residing in the data storage system, the devices being external to the adapter, the method comprising the steps of:
- configuring at least one network node in a network comprising a plurality of network nodes in the adapter, the configuring of at least one network node changing a topology configuration of the network between a first network topology and a second network topology, the communication permitted by the network among at least certain of the processors and the devices being different depending upon which of the first topology and the second topology the network has;
- wherein the data storage system includes disks, a cache, and disk controllers which are configured to operate as interfaces between the disks and the cache;
- wherein the processors are configured to operate as interfaces between the data exchanging devices and the cache; and
- wherein the step of configuring at least one network node includes:
  - selectively providing one of (i) a multiple loop formation between the processors and the data exchanging devices when the network has the first topology and (ii) a single loop formation between the processors and the data exchanging devices when the network has the second topology.

* * * * *